(12) United States Patent  
Nishikawa et al.

(10) Patent No.: US 8,526,170 B2  
(45) Date of Patent: Sep. 3, 2013

(54) ELECTRONIC EQUIPMENT CAPABLE OF WIRELESS COMMUNICATION

(75) Inventors: Kenji Nishikawa, Hyogo (JP); Yasuharu Matsuoka, Osaka (JP)

(73) Assignee: Panasonic Corporation, Osaka (JP)

(*) Notice: Subject to any disclaimer, the term of this patent is extended or adjusted under 35 U.S.C. 154(b) by 302 days.

(21) Appl. No.: 12/896,006

(22) Filed: Oct. 1, 2010

(65) Prior Publication Data  
US 2011/0080696 A1    Apr. 7, 2011

(30) Foreign Application Priority Data

Oct. 7, 2009  (JP) ................................ 2009-233668  
Jun. 8, 2010  (JP) ................................ 2010-130782

(51) Int. Cl.  
*H05K 5/00*  (2006.01)  
*H05K 7/00*  (2006.01)  
*G06F 1/16*  (2006.01)

(52) U.S. Cl.  
USPC ............. 361/679.01; 361/679.26; 361/679.3; 361/740; 361/752; 361/753

(58) Field of Classification Search  
USPC ................. 361/679.26, 679.3, 740, 752, 753, 361/679.01  
See application file for complete search history.

(56) References Cited

U.S. PATENT DOCUMENTS 5,777,856 A * 7/1998  Phillips et al. ................ 361/816

FOREIGN PATENT DOCUMENTS

JP    2004-214051    7/2004

* cited by examiner

*Primary Examiner* — Anthony Haughton  
(74) *Attorney, Agent, or Firm* — Hamre, Schumann, Mueller & Larson, P.C.

(57) ABSTRACT

Electronic equipment is provided with a board 24a that includes an antenna circuit for transmitting and receiving a wireless signal and a ground pattern 24c for electrically grounding the antenna circuit, and a second casing 23 formed integrally with an antenna holding portion 23f for holding the board 24a. At least the antenna holding portion 23f in the second casing 23 is formed of a conductor. A clip 40 sandwiches the antenna holding portion 23f and the board 24a in a state where the ground pattern 24c and the antenna holding portion 23f are in contact with each other.

9 Claims, 18 Drawing Sheets

ELECTRONIC EQUIPMENT CAPABLE OF WIRELESS COMMUNICATION

BACKGROUND

1. Field

The present application relates to electronic equipment capable of wireless communication.

2. Description of Related Art

Recently, regarding electronic equipment such as a laptop computer, those equipped with a wireless communications system, such as a system that connects to a network such as LAN (Local Area Network) wirelessly and a system such as Bluetooth (trademark) that connects to an access point wirelessly, have become mainstream. Such a wireless communication system often is realized by installing a board mounted with an antenna circuit (hereinafter, referred to as an antenna board) in the electronic equipment. In many cases, the antenna board is fixed in a casing of the electronic equipment using screws.

JP 2004-214051 A discloses a coaxial cable fixing mechanism in which a holding bracket is attached to a cylindrical sleeve that was fixed to a coaxial cable by soldering, and then is fixed to a ground of a board. Further, JP 2004-214051 A discloses that the holding bracket is fixed to the board using screws or soldering.

However, since the holding bracket disclosed by JP 2004-214051 is fixed to the board using screws or soldering, the number of components is increased and a step of fixing the board using screws or soldering is required, which results in increases in costs and assembling steps, respectively.

SUMMARY

Electronic equipment of the present application includes: a board that is provided with an antenna circuit for transmitting and receiving a wireless signal and a ground portion for electrically grounding the antenna circuit: and a casing that is formed integrally with a holding portion for holding the board, wherein at least the holding portion in the casing is formed of a conductor, the electronic equipment further includes: a grasping member that sandwiches the holding portion and the board in a state where the ground portion and the holding portion are in contact with each other.

DETAILED DESCRIPTION OF THE EMBODIMENT

Electronic equipment of the present application includes: a board that is provided with an antenna circuit for transmitting and receiving a wireless signal and a ground portion for electrically grounding the antenna circuit; and a casing that is formed integrally with a holding portion for holding the board, wherein at least the holding portion in the casing is formed of a conductor. The electronic equipment further includes: a grasping member that sandwiches the holding portion and the board in a state where the ground portion and the holding portion are in contact with each other.

In the electronic equipment of the present application, the grasping member is elastically deformable. With this configuration, the grasping member sandwiches the holding portion and the board while pressing them, whereby the position of the board can be stabilized.

In the electronic equipment of the present application, the grasping member is elastically deformable, and includes a first sandwiching portion capable of being in contact with the board and a second sandwiching portion capable of being in contact with the holding portion, and a space between the first sandwiching portion and the second sandwiching portion is smaller than the sum of a thickness of the holding portion and a thickness of the board. With this configuration, the grasping member sandwiches the holding portion and the board while pressing them, whereby the position of the board can be stabilized.

In the electronic equipment of the present application, the casing includes a protrusion in the vicinity of the holding portion, and the protrusion and the holding portion sandwich the second sandwiching portion side of the grasping member. With this configuration, the second sandwiching portion side in the grasping member is less likely to be displaced, whereby the position of the board can be stabilized.

In the electronic equipment of the present application, a region of the casing that overlaps with the antenna circuit in a state where the holding portion holds the board is formed from a material not blocking a radio wave. With this configuration, it is possible to suppress an effect by the casing with respect to the transmission/reception properties of the antenna circuit.

Embodiment 1

1. Configuration of Electronic Equipment

Figure 1:
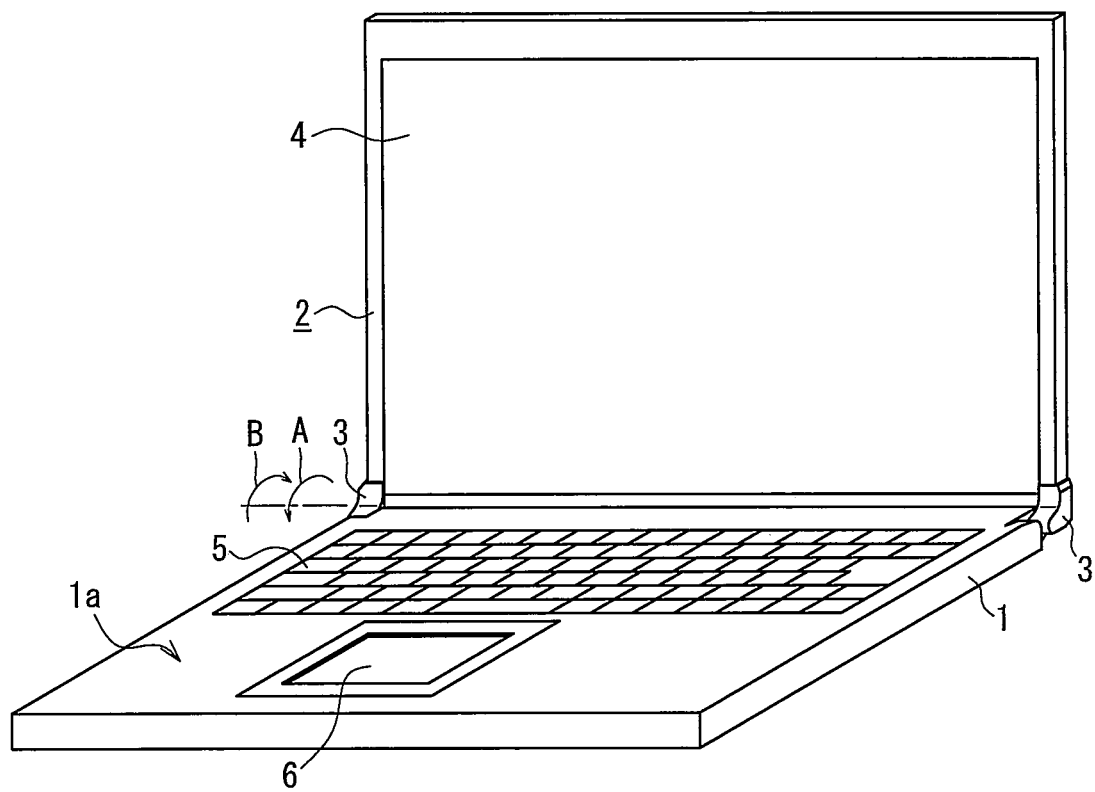
FIG. 1 is a perspective view of a laptop computer according to Embodiment 1.

FIG. 1 shows a perspective view of a laptop computer as an example of electronic equipment according to the present embodiment. As shown in FIG. 1, the laptop computer includes a first main body 1 and a second main body 2. The first main body 1 houses an electric circuit board on which a signal processing circuit is mounted, a hard disk drive, and the like. The second main body 2 includes a display device 4 (e.g., liquid crystal display). The first main body 1 and the second main body 2 are supported rotatably (in directions shown by arrows A and B) by hinge portions 3. By turning the second main body 2 from a position shown in FIG. 1 (first state) to a direction shown by the arrow A, the laptop computer is shifted to a second state in which the display device 4 and a keyboard 5 are opposed, close to each other. Further, if a face of the first main body 1 opposed to the second main body 2 in the second state is defined as "upper side", an upper side 1a of the first main body 1 includes the keyboard 5 that enables an operation of inputting various letters and a pointing device 6 that enables an operation of moving a pointer displayed on the display device 4 to a desired position. Note here that an information signal input/output from the keyboard 5, hard disk drive or the like is subjected to predetermined processing by the signal processing circuit (the drawing is omitted), and is converted into, for example, a display signal for a display on the display device 4.

Figure 2:
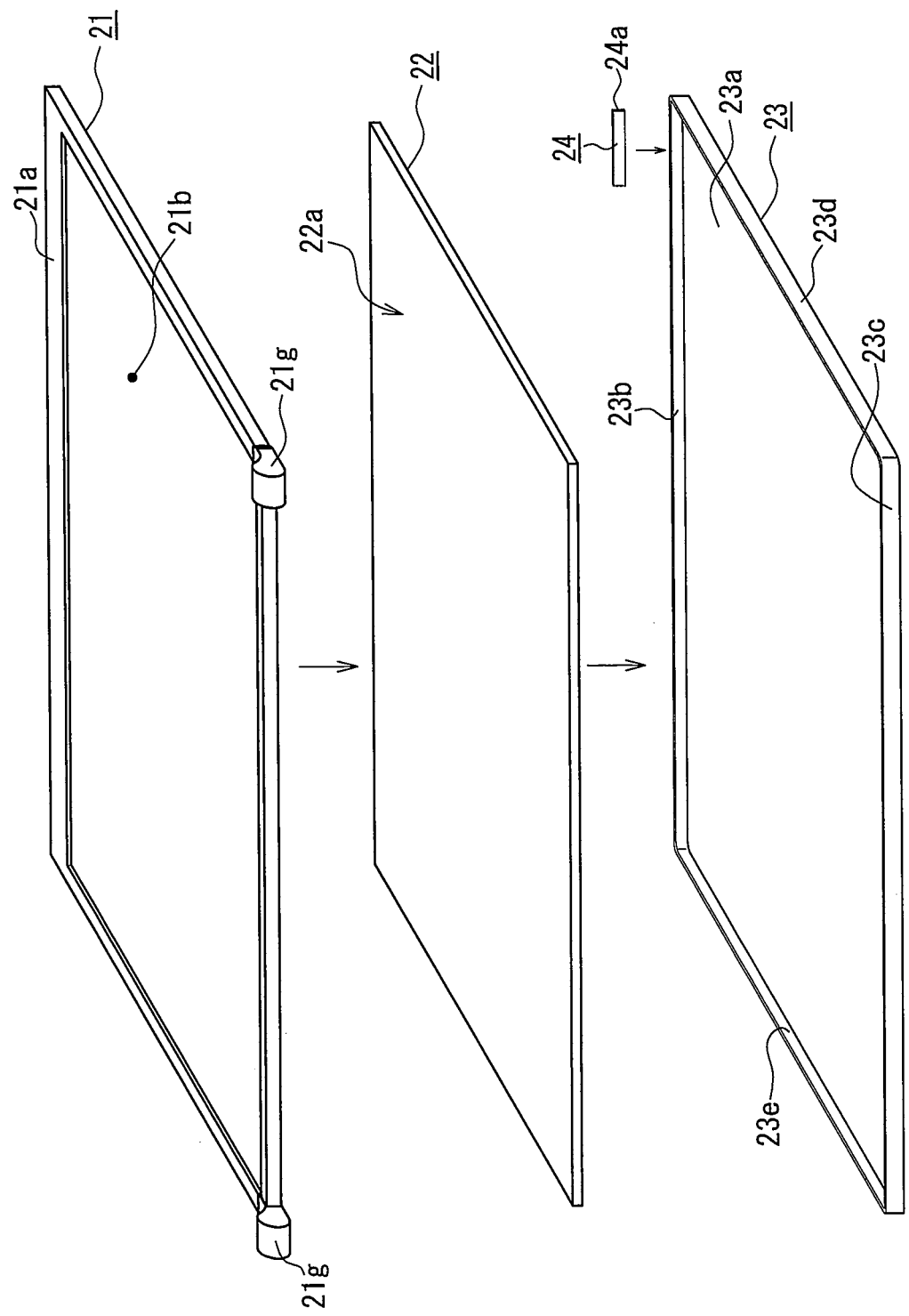
FIG. 2 is an exploded perspective view of a second main body according to Embodiment 1.
Figure 3:
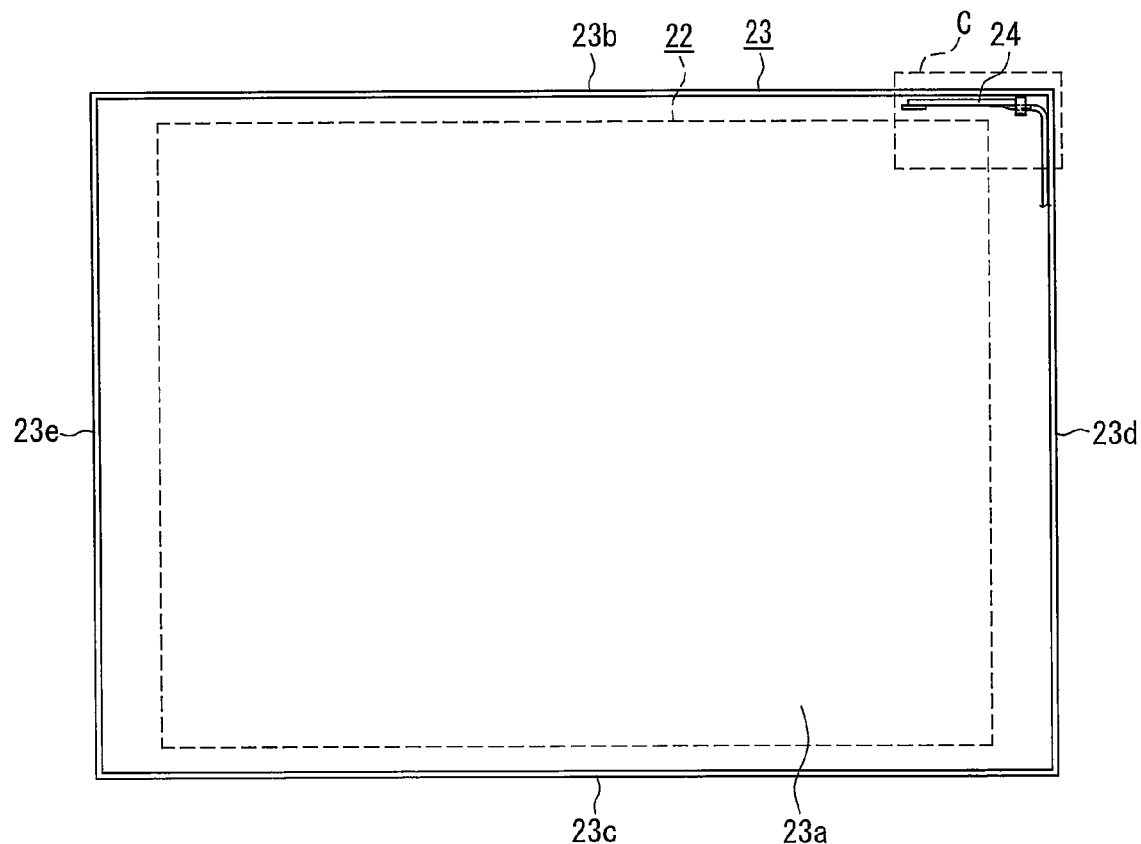
FIG. 3 is a plan view of a second casing according to Embodiment 1.

FIG. 2 is an exploded perspective view of the second main body 2. FIG. 3 is a plan view showing a bottom portion 23a side of a second casing in which an antenna module is held. The second main body 2 includes a first casing 21, a display panel 22 (e.g., liquid crystal panel), a second casing 23, and an antenna module 24, as shown in FIG. 2. Note here that the actual second main body 2 includes a wiring for passing a current to the display panel 22 and the like, in addition to the configuration shown in FIG. 2, but illustrations thereof are omitted for clarification of the drawing.

The first casing 21 can be formed of a resin or a metal, and is made thin, having a thickness of about a few millimeters, for thinning or downsizing the second main body 2. The first casing 21 includes a frame portion 21a, an opening portion 21b, and hinge covers 21g. The frame portion 21a forms the opening portion 21b, and in an assembled state of the second main body 2, a face thereof opposed to the second casing 23 is defined as "back face", and a back side of the back face (a face opposed to an operator when the laptop computer is in the first state as shown in FIG. 1) is defined as "front face". The opening portion 21b is formed in such a manner that an image displayed on the display panel 22 can be seen from the outside of the second main body 2. The hinge covers 21g are portions covering the hinge mechanism, and are connected to the first main body 1 via the hinge mechanism. Note here that when the first casing 21 is formed entirely of an insulating material such as a resin, there is no problem because the antenna module 24 will not be shielded electrically. However, when it is formed entirely of a metal, the antenna module 24 may be shielded electrically. Therefore, in the case where the first casing 21 is formed of a metal, it is preferable that only the vicinity of an antenna holding portion 23f in the bottom portion 23a is formed of an insulating material (rigid plastic, for example). With this configuration, a transmission/reception face in the antenna module 24 is not shielded electrically, whereby it is possible to improve transmission/reception properties of the antenna module 24.

The display panel 22 includes two glass plates containing liquid crystals, an electric circuit board for passing a current between these two glass plates, etc., and can display an image based on an electric signal input from the outside. A display face 22a is a face on which an image is displayed. The display panel 22 corresponds to the display device 4 shown in FIG. 1.

The second casing 23 can be formed of a resin or a metal, and is formed in the present embodiment of magnesium for improving impact resistance. The second casing 23 is made thin, having a thickness of about a few millimeters, for thinning or lightening the second main body 2. The second casing 23 includes the bottom portion 23a, a first side portion 23b, a second side portion 23c, a third side portion 23d, and a fourth side portion 23e. The bottom portion 23a is disposed opposed to a rear face of the display panel 22 (back face of the display face 22a). The first side portion 23b, the second side portion 23c, the third side portion 23d, and the fourth side portion 23e are provided upright on an outer peripheral edge of the bottom portion 23a in such a manner as to surround the bottom portion 23a. The second side portion 23c is a side portion that is substantially parallel to and closest to a line segment connecting a pair of the hinge portions 3 (see FIG. 1). The first side portion 23b is a side portion that is formed at a position substantially parallel to and opposed to the second side portion 23c. The third side portion 23d and the fourth side portion 23e are opposed to each other, and their both ends are connected respectively to the first side portion 23b and the second side portion 23c.

In the antenna module 24, an antenna circuit (not shown) capable of transmitting/receiving radio waves is mounted on one or both faces of a resin-made board 24a. Note here that although the laptop computer of the present embodiment includes one antenna module 24, it may include a plurality of antenna modules. Further, the antenna module 24 may be one on which only a loop coil is mounted, or the one on which a loop coil, a reception filter and a transmission filter are mounted.

In an assembly of the second main body 2, in FIG. 3, first, the display panel 22 is fixed by bonding to the back face of the frame portion 21a of the first casing 21 using an adhesive or the like. At this time, a part or an entirety of an effective display area of the display face 22a is disposed as specified with respect to the opening portion 21b of the first casing 21. In other words, the display panel 22 is disposed in the first casing 21 so that an image displayed on the display face 22a can be seen from the outside via the opening portion 21b.

Next, the antenna module 24 is held by the antenna holding portion 23f (described later) formed on the second casing 23. Specifically, one end of the antenna module 24 in a longitudinal direction is sandwiched together with the antenna holding portion 23f by a clip 40, and the other end thereof in the longitudinal direction is held by an antenna holding portion 23g. Note here that a configuration of the clip 40 and a specific holding structure of the antenna module 24 will be described later.

2. Holding Structure of the Antenna Module 24

Figure 4:
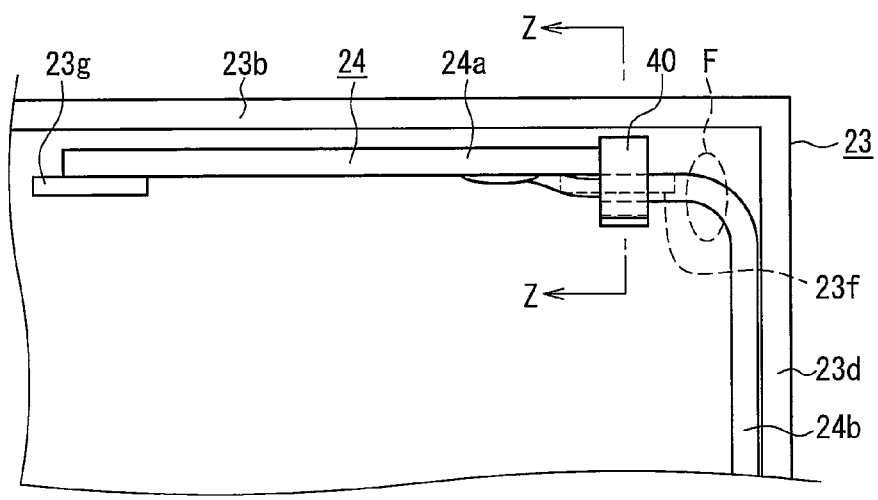
FIG. 4 is a main portion plan view of a section C in FIG. 3.
Figure 5:
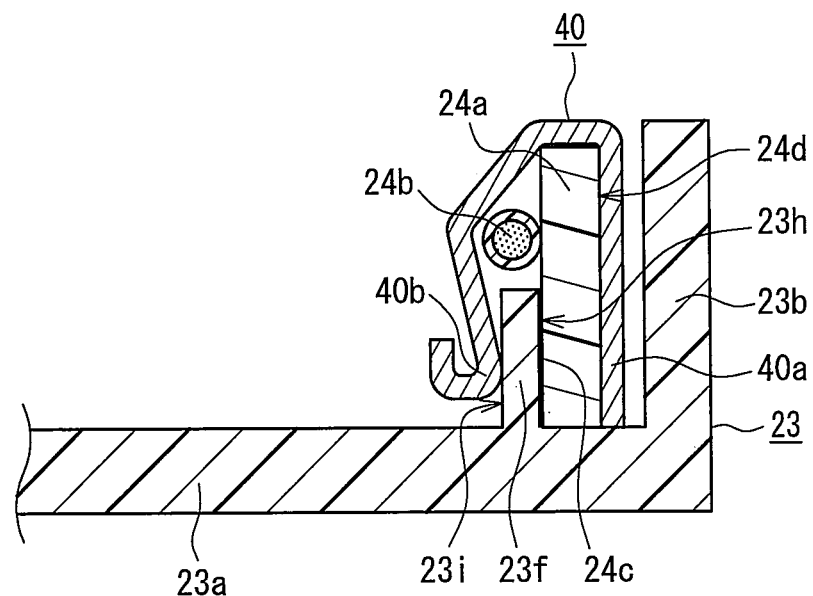
FIG. 5 is a cross-sectional view taken along a line Z-Z in FIG. 4.

FIG. 4 is an enlarged plan view of a section C in FIG. 3. FIG. 5 is a cross-sectional view taken along a line Z-Z in FIG. 4.

As shown in FIG. 4, in the vicinity of an intersection of the side portion 23b and the side portion 23d in the bottom portion 23a of the second casing 23, the antenna holding portions 23f and 23g are formed. A space in which at least the board 24a of the antenna module 24 can be disposed is provided between the antenna holding portions 23f, 23g and the side portion 23b of the second casing 23. As shown in FIG. 5, the antenna holding portion 23f has a contact surface 23h that can be in contact with a ground pattern 24c provided on the board 24a. In the present embodiment, since the entire surface of the second casing 23 exposes metal, naturally, the contact surface 23h also exposes metal. Note here that although in the present embodiment the entire surface of the second casing 23 exposes metal, a part thereof excluding at least the contact surface 23h may be coated with an insulator. Exposing the metallic part on the contact surface 23h is essential for allowing the ground pattern 24c of the antenna module 24 to be a ground potential, by bringing the ground pattern 24c and the exposed metallic part into contact with each other. The antenna holding portion 23f has a contact surface 23i that can be in contact with a second sandwiching portion 40b (described later) of the clip 40.

As shown in FIG. 5, the board 24a of the antenna module 24 includes the ground pattern 24c. In a state in which the antenna module 24 is held by the antenna holding portions 23f and 23g, the ground pattern 24c is in contact with the contact surface 23h of the antenna holding portion 23f. By bringing the ground pattern 24c into contact with the contact surface 23h, the ground pattern 24c can be set as a ground potential. Thus, it is possible to ground the antenna module 24 via the second casing 23. Further, as shown in FIG. 4, one end of the antenna module 24 in the longitudinal direction is positioned between the antenna holding portion 23f and the side portion 23b so as to be sandwiched by the clip 40, and the other end thereof in the longitudinal direction is held between the antenna holding portion 23g and the side portion 23b. Further, a coaxial cable 24b is connected to the board 24a by soldering. The coaxial cable 24b is drawn along the side portions 23b and 23d of the second casing 23, and is connected electrically to the electric circuit board housed in the first main body 1 (see FIG. 1).

Figure 6:
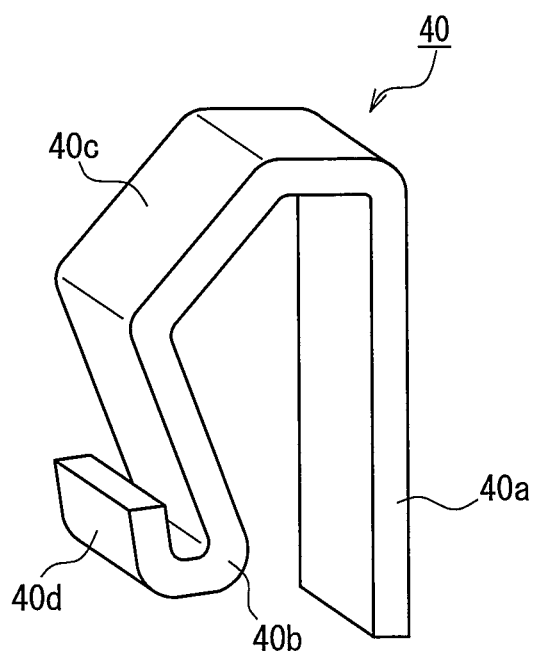
FIG. 6 is a perspective view of a clip.
Figure 7:
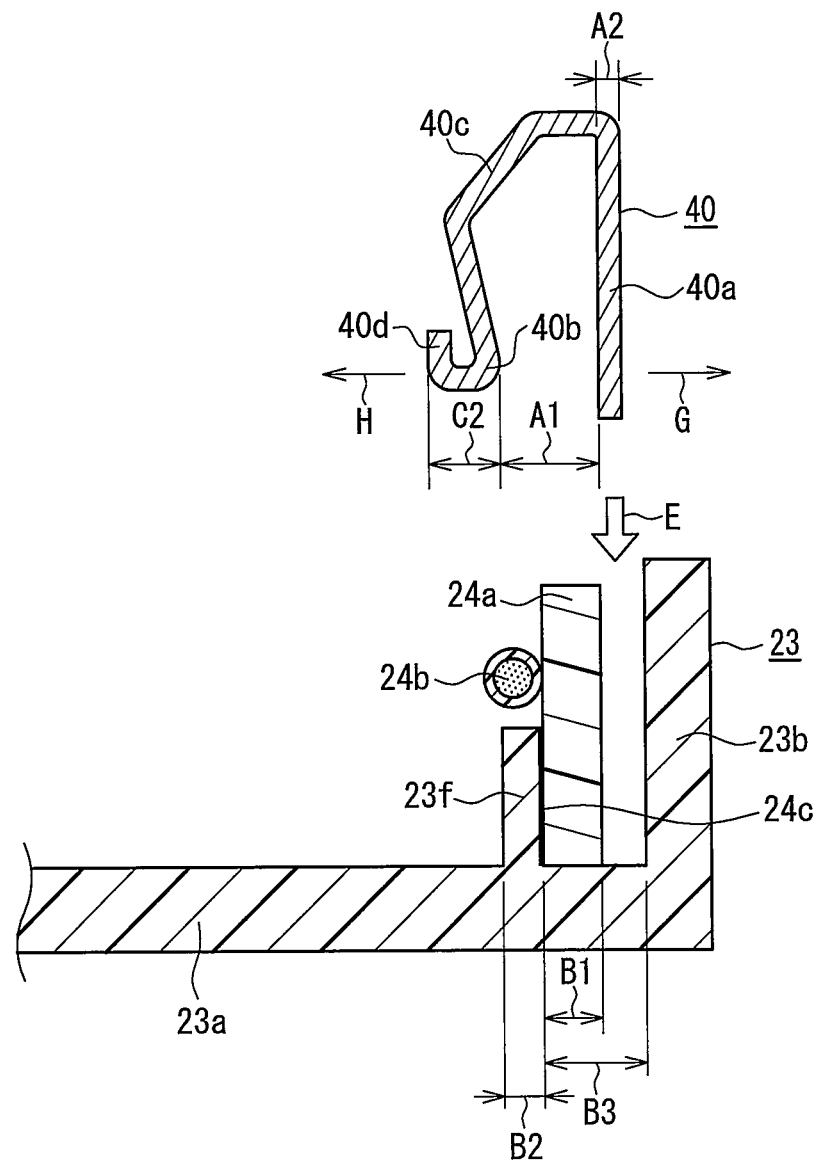
FIG. 7 is an exploded cross-sectional view of the clip and the casing.

FIG. 6 is a perspective view of the clip 40. FIG. 7 is an exploded cross-sectional view of the clip and the second casing 23. The clip 40 is formed of a metal or a thin resin whose entire body has spring characteristics. Note here that the clip 40 preferably is formed of an insulating material such as a resin, taking into consideration an effect with respect to the transmission/reception properties of the antenna module 24. As shown in FIG. 5, the clip 40 includes sandwiching portions 40a and 40b for sandwiching the board 24a and the antenna holding portion 23f. Specifically, the first sandwiching portion 40a of the clip 40 holds a front face 24d side of the board 24a (if a face with the ground pattern 24c in the board 24a is defined as "back face"), and the second sandwiching portion 40b holds a contact face 23i side of the antenna holding portion 23f. Further, as shown in FIG. 7, the clip 40 has a relationship expressed by:

$$A1 \leq (B1+B2)$$

where A1 represents a space between the first sandwiching portion 40a and the second sandwiching portion 40b in a free state (no-load state), B1 represents a thickness of the board 24a (including a thickness of the ground pattern 24c), and B2 represents a thickness of the antenna holding portion 23f. Note here that there is a relationship expressed by:

$$B3 > (B1+A2)$$

where B3 represents a space between the antenna holding portion 23f and the side portion 23b of the second casing 23; B1 represents the thickness of the board 24a; and A2 represents a thickness of the first sandwiching portion 40a in the clip 40. Thereby the board 24a and the first sandwiching portion 40a of the clip 40 can be disposed between the antenna holding portion 23f and the side portion 23b.

In the case of sandwiching the antenna holding portion 23f and the board 24a by the clip 40, first, the first sandwiching portion 40a is deformed elastically in a direction shown by an arrow G so that the space A1 at least becomes larger than the sum of the dimension B1 and the diameter of the coaxial cable 24b, and the second sandwiching portion 40b is deformed elastically in a direction shown by an arrow H. Note here that the amounts of elastic deformation of the first sandwiching portion 40a and the second sandwiching portion 40b in the present embodiment are the case where the diameter of the coaxial cable 24b is larger than the dimension B2. When the diameter of the coaxial cable 24b is smaller than the dimension B2, the first sandwiching portion 40a and the second sandwiching portion 40b are deformed elastically so that the space A1 becomes larger than the sum of the dimensions B1 and B2, whereby the board 24a and the antenna holding portion 23f can be sandwiched by the clip 40.

Next, the clip 40 is moved in the direction shown by an arrow E while the first sandwiching portion 40a and the second sandwiching portion 40b are expanded by pressing in the directions shown by the arrows G and H, respectively. Then, the first sandwiching portion 40a is inserted between the side portion 23b and the board 24a, and the second sandwiching portion 40b is moved to the position opposed to the contact face 23i of the antenna holding portion 23f. At this time, the clip 40 is moved in the direction shown by the arrow E until an end of the first sandwiching portion 40a comes into contact with the bottom portion 23a. Thus, the clip 40 is positioned. Note here that although in the present embodiment the clip 40 is positioned where the end of the first sandwiching portion 40a comes into contact with the bottom portion 23a, it may be positioned where both the first sandwiching portion 40a and the second sandwiching portion 40b come into contact with the bottom portion 23a.

Next, the first sandwiching portion 40a and the second sandwiching portion 40b are released from the state of being expanded by pressing, and hence, a force to return to its original shape (see FIG. 7) acts in the clip 40. Thereby, as shown in FIG. 5, the first sandwiching portion 40a contacts and presses the front face 24d of the board 24a, and the second sandwiching portion 40b contacts and presses the contact face 23i of the antenna holding portion 23f. That is, the clip 40 is in a state of sandwiching the board 24a and the antenna holding portion 23f. In the state shown in FIG. 5, the clip 40 sandwiches the board 24a and the antenna holding portion 23f, with the shape being deformed in a relationship expressed by:

$$A1 = (B1+B2).$$

3. Effects of Embodiment, etc.

According to the present embodiment, since the board 24a and the antenna holding portion 23f are sandwiched by the clip 40, the antenna module 24 is less likely to be displaced in a direction where the antenna module 24 is detached from the antenna holding portion 23f (direction where the antenna module 24 comes out from a space between the first side portion 23b and the antenna holding portion 23f), whereby the position is stabilized. Therefore, even if shocks or vibrations are applied to the second main body 2, the antenna module 24 is less likely to be displaced, whereby the change in the transmission/reception properties in the antenna module 24 can be suppressed. Further, since there is a low possibility that the ground pattern 24c on the board 24a and the antenna holding portion 23f are spaced apart from each other, the ground state of the antenna module 24 can be stabilized.

Further, since the antenna module 24 is held to the second casing 23 by the clip 40, a means (screws, soldering, or the like) for fixing the clip 40 to the second casing 23 is not required. Thereby the number of components is reduced, and costs can be reduced.

Furthermore, a step of fixing the antenna module 24 by screws, soldering, or the like is not required when the antenna module 24 is secured to the second casing 23. Thereby the number of assembling steps is reduced, and the assembly becomes easier.

Note here that, in the present embodiment, as shown in FIG. 5, etc., in the state where the clip 40 sandwiches the board 24a and the antenna holding portion 23f, there is a space between the clip 40 and the coaxial cable 24b. However, the present invention may have a configuration in which the clip 40 and the coaxial cable 24b are in contact with each other. By bringing the clip 40 and the coaxial cable 24b into contact with each other, the position of the coaxial cable 24b is stabilized and, for example, distortion at a connection part (soldered part) between the board 24a and the coaxial cable 24b can be suppressed. Therefore, it is possible to prevent poor connection between the board 24a and the coaxial cable 24b, etc.

Further, as shown by the arrow E in FIG. 7, the board 24a and the antenna holding portion 23f are sandwiched by displacing the clip 40 in a direction substantially perpendicular to the bottom portion 23a, but they also can be sandwiched by displacing the clip 40 in a planar direction of the bottom portion 23a. Specifically, first, in the vicinity of a section F of the coaxial cable 24b (see FIG. 4) for example, the coaxial cable 24b is inserted in a curved portion 40c of the clip 40. Next, the clip 40 is moved to the board 24a side along the coaxial cable 24b, and then, the first sandwiching portion 40a is inserted between the board 24a and the side portion 23b, and the other end 40b is moved to the contact face 23i side of the antenna holding portion 23f. At this time, since the space A1 between the sandwiching portions 40a and 40b of the clip 40 in a free state is smaller than the sum of the thickness B1 of the board 24a and the diameter of the coaxial cable 24b, the first sandwiching portion 40a and the second sandwiching portion 40b are deformed elastically so that the space A1 becomes larger than the sum of the dimension B1 and the diameter of the coaxial cable 24b, and are moved to a position to sandwich the board 24a and the antenna holding portion 23f. By inserting the first sandwiching portion 40a between the board 24a and the side portion 23b, moving the other end 40b to the contact face 23i side of the antenna holding portion 23f, and thereafter releasing the clip 40 from the state of being deformed elastically, the first sandwiching portion 40a contacts and presses the board 24a, and the second sandwiching portion 40b contacts and presses the contact face 23i of the antenna holding portion 23f. Thereby the clip 40 sandwiches the board 24a and the antenna holding portion 23f. Note here that the amounts of elastic deformation of the first sandwiching portion 40a and the second sandwiching portion 40b are the case where the diameter of the coaxial cable 24b is larger than the dimension B2. When the diameter of the coaxial cable 24b is smaller than the dimension B2, the first sandwiching portion 40a and the second sandwiching portion 40b are deformed elastically so that the space A1 becomes larger than the sum of the dimensions B1 and B2, whereby the board 24a and the antenna holding portion 23f can be sandwiched by the clip 40.

Figure 8:
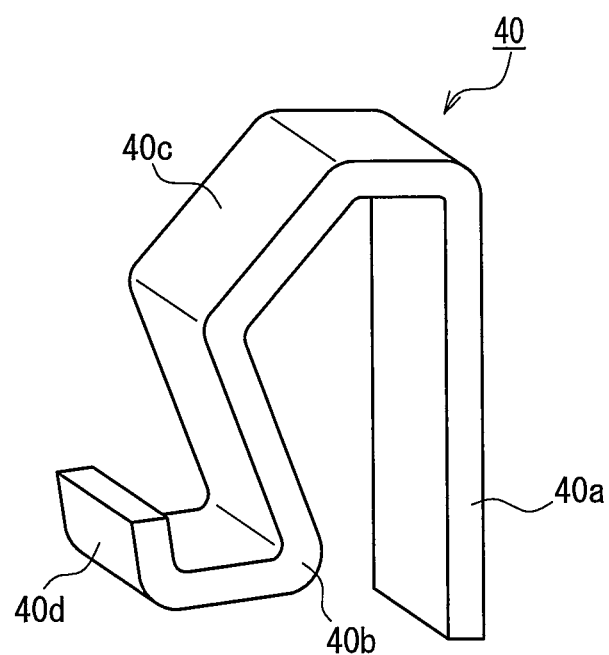
FIG. 8 is a perspective view showing a modification example 1 of the clip.
Figure 9:
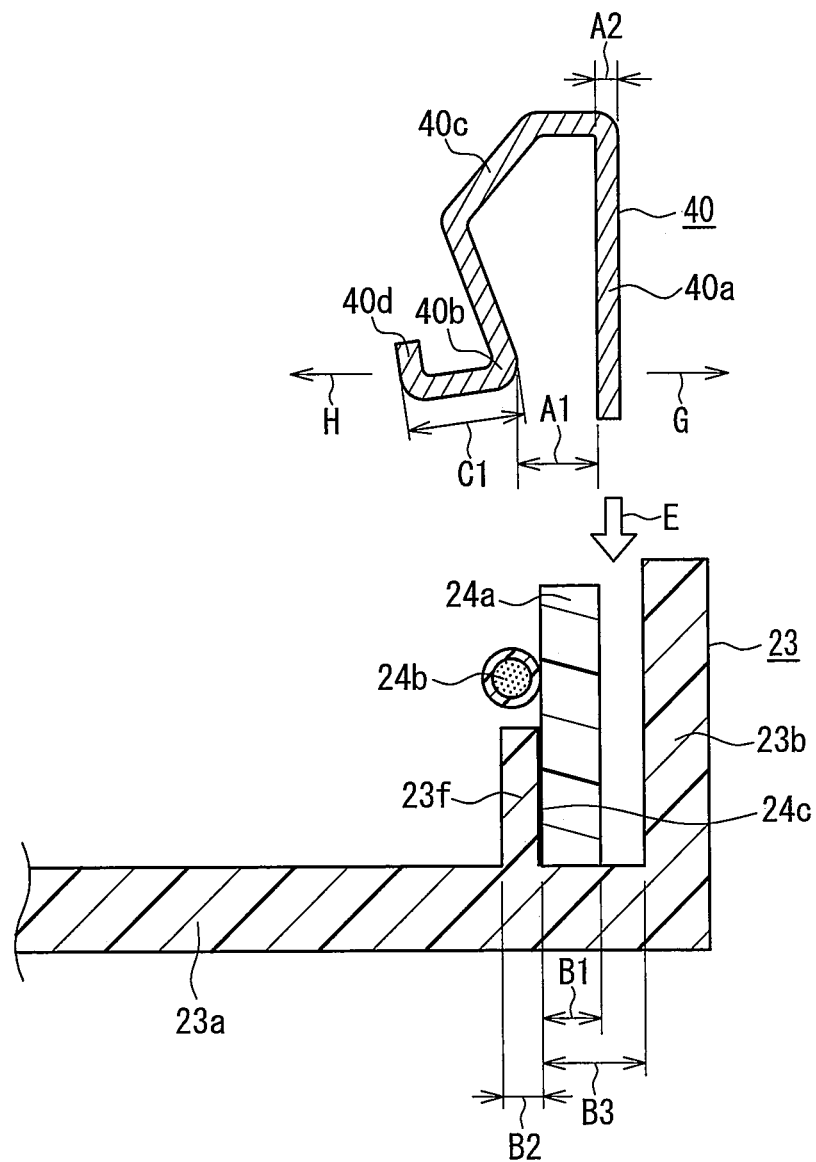
FIG. 9 is an exploded cross-sectional view showing the modification example 1 of the clip and the casing.

FIG. 8 is a perspective view showing a configuration of a modification example 1 of the clip 40. FIG. 9 is a main portion cross-sectional view of the clip 40 and the second casing 23 according to the modification example 1. Regarding the clip 40 according to the modification example 1, a length C1 of an extended portion 40d shown in FIG. 9 is longer than a length C2 of the extended portion 40d shown in FIG. 7. By making the length C1 of the extended portion 40d longer, a user can grasp the extended portion 40d easily by fingers when sandwiching the board 24a and the antenna holding portion 23f by the clip 40 and/or the clip 40 can be deformed easily because of the increased moment at the time of the deformation. This allows the clip 40 to sandwich the board 24a and the antenna holding portion 23f easily.

Figure 10:
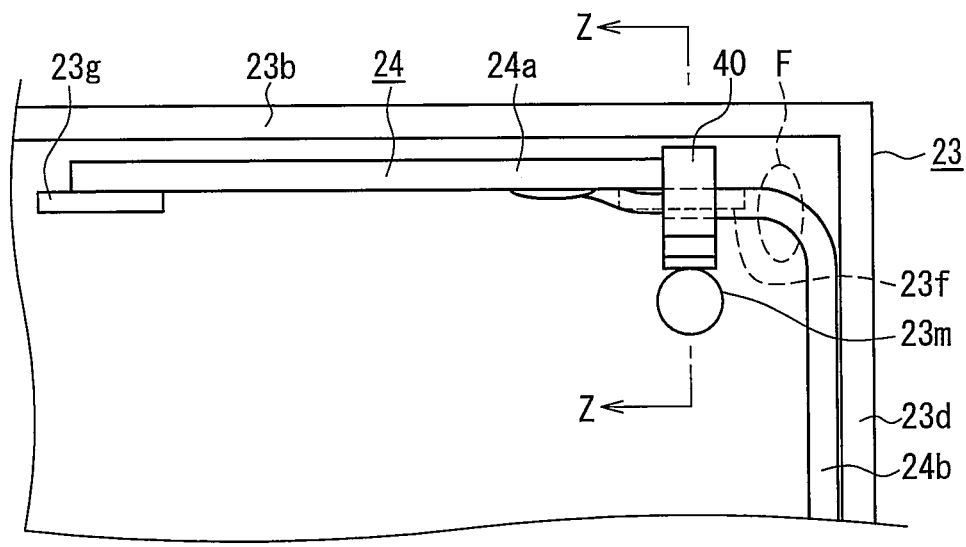
FIG. 10 is a main portion plan view showing a modification example 2 of the clip and the casing.
Figure 11:
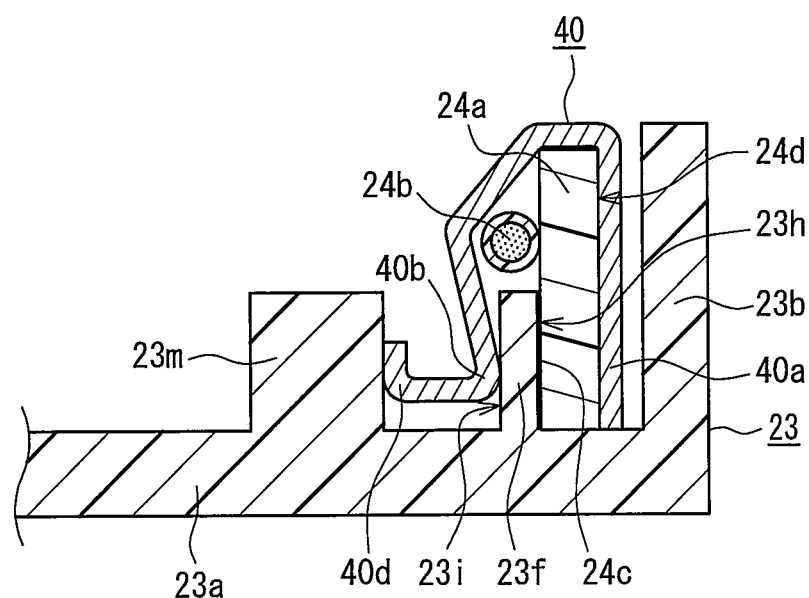
FIG. 11 is a cross-sectional view taken along a line Z-Z in FIG. 10.
Figure 12:
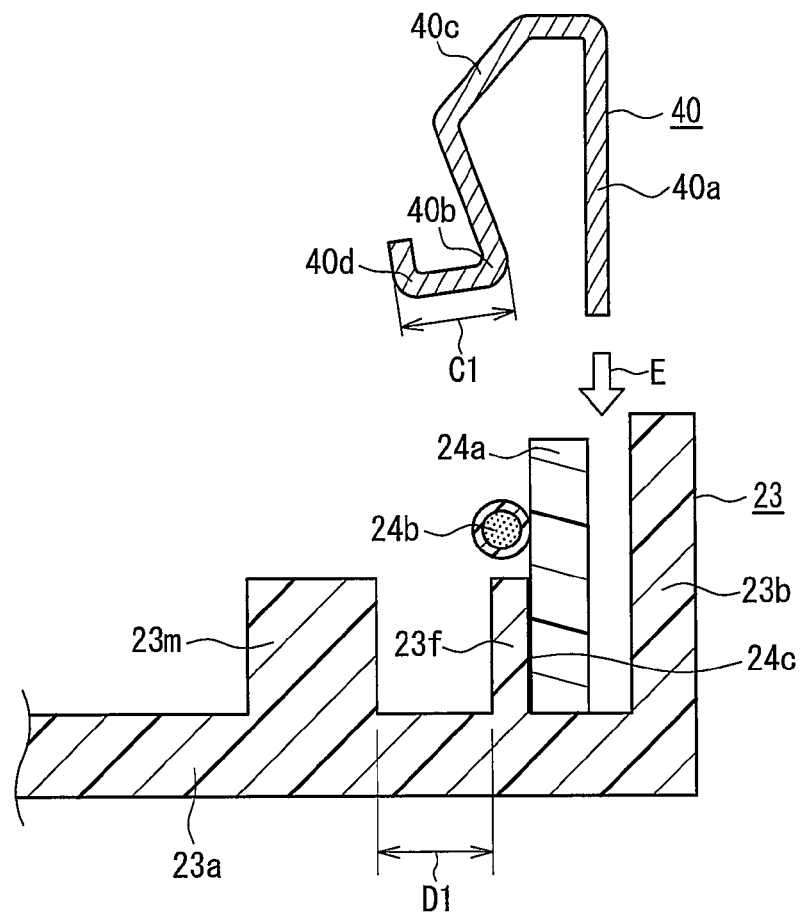
FIG. 12 is an exploded cross-sectional view of the clip and the casing.

FIG. 10 is a main portion plan view showing the vicinity of the intersection of the side portion 23b and the side portion 23d in the second casing 23. FIG. 11 is a cross-sectional view taken along a line Z-Z in FIG. 10. FIG. 12 is an exploded cross-sectional view of the clip 40 and the second casing 23. As shown in FIGS. 10-12, the vicinity of the second sandwiching portion 40b of the clip 40 may be press-fitted into a part of the second casing 23 so that the clip 40 is held to the second casing 23 (modification example 2). The second casing 23 shown in FIGS. 10-12 additionally includes a cylindrical protrusion 23m, as compared with the second casing 23 shown in FIG. 5. As shown in FIG. 12, there is a relationship expressed by:

$$C1 \geq D1$$

where C1 represents a width dimension of the extended portion 40d of the clip 40, and D1 represents a space between the protrusion 23m and the antenna holding portion 23f. Therefore, when the board 24a and the antenna holding portion 23f are sandwiched by the clip 40, a part between the second sandwiching portion 40b and the extended portion 40d is press-fitted into a part between the antenna holding portion 23f and the protrusion 23m. With this configuration, the clip 40 can be held more strongly at the sandwiching position, and the displacement of the antenna module 24 can be suppressed further. Moreover, the clip 40 is unlikely to drop off from the second casing 23.

Figure 13:
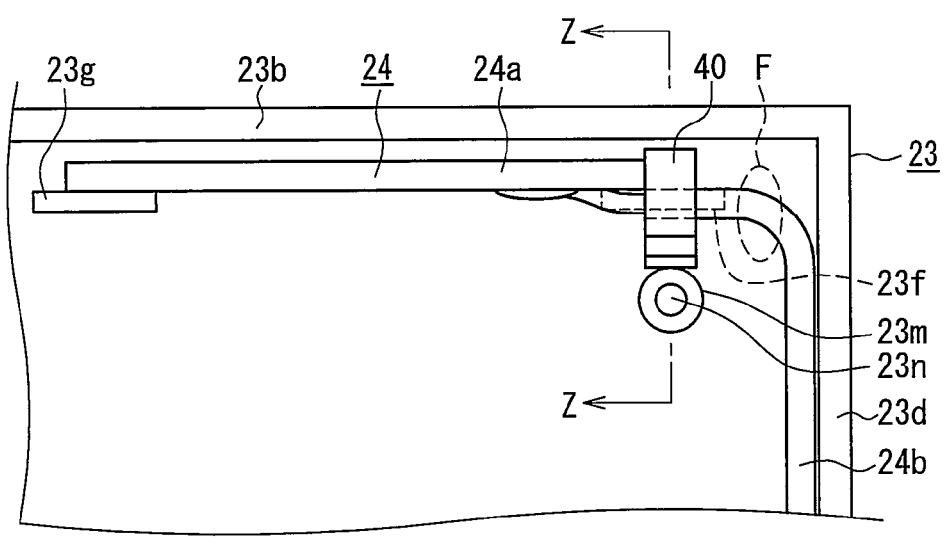
FIG. 13 is a main portion plan view showing a modification example 3 of the clip and the casing according to Embodiment 1.
Figure 14:
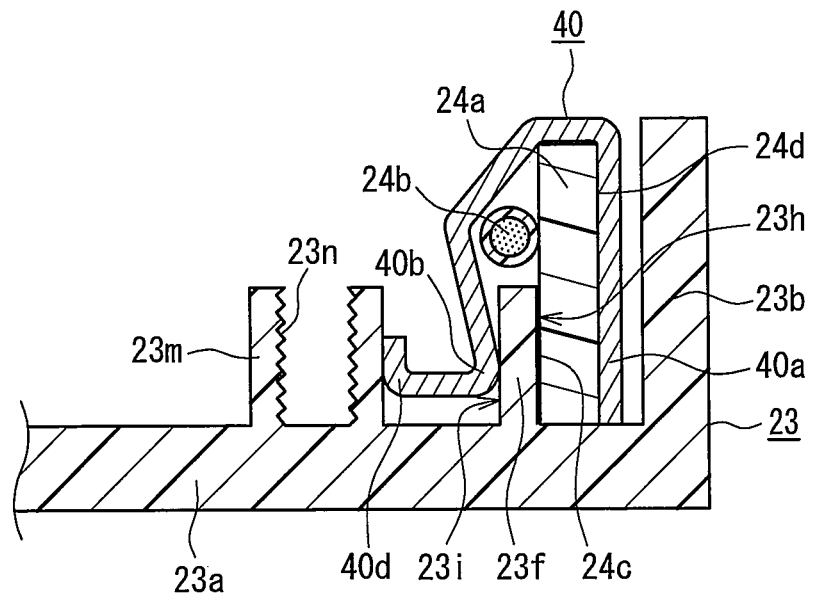
FIG. 14 is a cross-sectional view taken along a line Z-Z in FIG. 13.

FIG. 13 is a plan view of the casing that includes the protrusion 23m with a screw hole 23n. FIG. 14 is a cross-sectional view taken along a line Z-Z in FIG. 13. The protrusion 23m may be configured, not only for holding the clip 40, but also, for example, to have the screw hole 23n as shown in FIGS. 13 and 14 (modification example 3). The screw hole 23n is a hole in which a screw is inserted when the first casing 21 and the second casing 23 are fixed with each other using the screw. With this configuration, the protrusion 23m and the screw hole 23n are provided in the same area, whereby the second casing 23 can be downsized.

Further, in the present embodiment, the clip 40 is made of a resin, but it may be formed of a conductor such as a metal. By forming the clip 40 from a conductor, and when the front face 24d of the board 24a of the antenna module 24 also is provided with a ground pattern for example, it is possible to set the ground pattern as a ground potential. Specifically, by bringing the first sandwiching portion 40a of the clip 40 into contact with the ground pattern on the front face 24d of the board 24a, and bringing the second sandwiching portion 40b of the clip 40 into contact with the antenna holding portion 23f, the ground pattern on the front face 24d and the metallic antenna holding portion 23f are connected electrically with each other, which allows the ground pattern to be a ground potential.

Further, an area in the front face 24d of the board 24a that comes into contact with the first sandwiching portion 40a of the clip 40 and an area in the antenna holding portion 23f that comes into contact with the second sandwiching portion 40b of the clip 40 may be shaped to have a high friction coefficient (shape with slight projections and depressions, etc.). With this configuration, the clip 40 is even less likely to be displaced in the direction shown by the arrow D, whereby the location of the antenna module 24 is stabilized. In the configuration shown by FIGS. 10-12, it is preferable that a cylindrical surface of the protrusion 23m also is shaped to have a high friction coefficient. Note here that the parts having high friction coefficients in the antenna holding portion 23f and the protrusion 23m can be formed at the same time as the molding of the second casing 23, whereby the number of components is not increased, and the number of steps in assembling the laptop computer is not increased. Further, the part having a high friction coefficient in the front face 24d of the board 24a can be formed at the same time as the manufacture of the board 24a by the molding of a resin, whereby the number of components is not increased, and the number of steps in assembling the laptop computer is not increased.

Further, in the present embodiment, the laptop computer is illustrated as an example of electronic equipment, but the electronic equipment is not limited thereto as long as it includes at least an electric circuit board and a casing for holding the electric circuit board.

Furthermore, the ground pattern 24c in the present embodiment is an exemplary ground portion. The board 24a in the present embodiment is an exemplary board. The antenna holding portion 23f in the present embodiment is an exemplary holding portion. The second casing 23 in the present embodiment is an exemplary casing. The clip 40 in the present embodiment is an exemplary grasping member. The first sandwiching portion 40a in the present embodiment is an exemplary first sandwiching portion. The second sandwiching portion 40b in the present embodiment is an exemplary second sandwiching portion. The protrusion 23m in the present embodiment is an exemplary protrusion.

Embodiment 2

1. Configuration of Electronic Equipment

Figure 15:
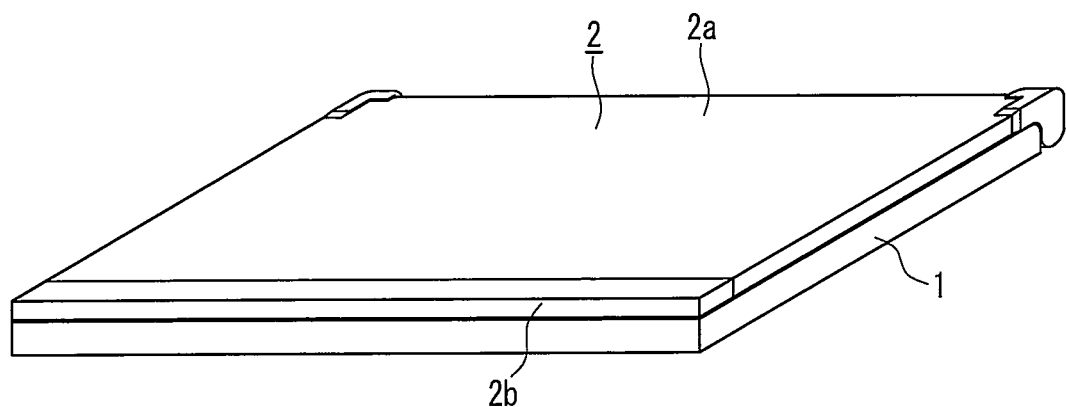
FIG. 15 is a perspective view of a laptop computer according to Embodiment 2.

FIG. 15 is a perspective view of the laptop computer in the second state. By turning the second main body 2 from the position shown in FIG. 1 (first state) to the direction shown by the arrow A, the laptop computer is shifted to the second state in which the display device 4 and the keyboard 5 are opposed, close to each other, as shown in FIG. 15.

Figure 16:
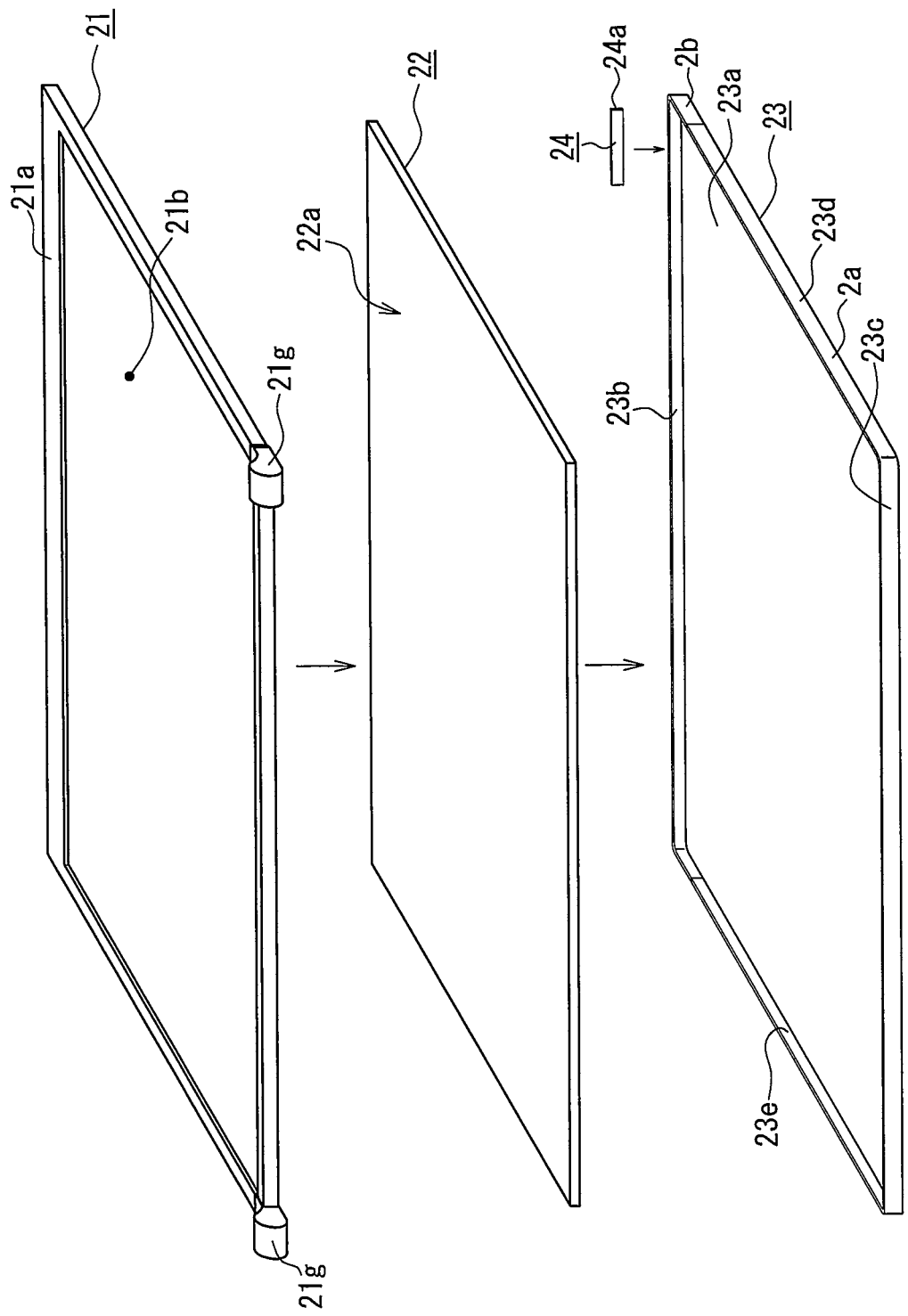
FIG. 16 is an exploded perspective view of a second main body according to Embodiment 2.
Figure 17:
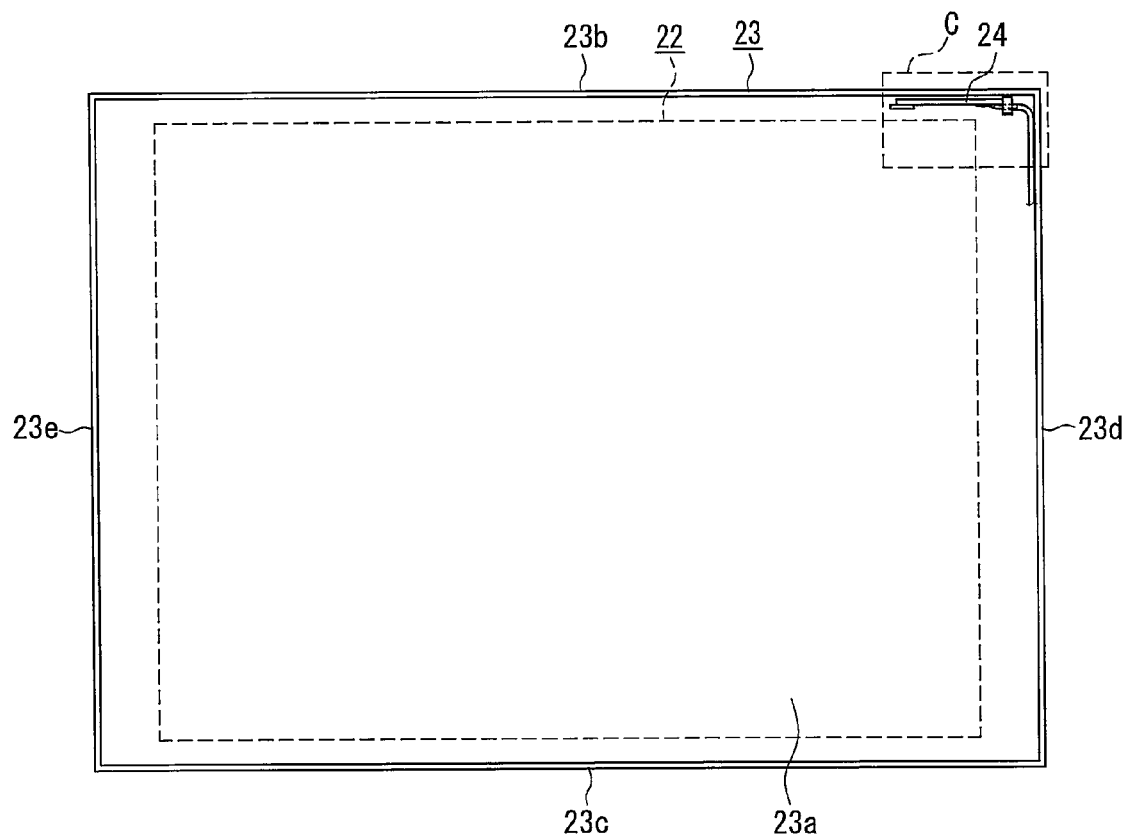
FIG. 17 is a plan view of a second casing according to Embodiment 2.

FIG. 16 is an exploded perspective view of the second main body. FIG. 17 is a plan view showing the bottom portion 23a side of the second casing in which the antenna module is held. The second main body 2 includes the first casing 21, the display panel 22, the second casing 23, and the antenna module 24, as shown in FIG. 16. Note here that the actual second main body 2 includes a wiring for passing a current to the display panel 22 and the like, in addition to the configuration shown in FIG. 16, but illustrations thereof are omitted for clarification of the drawing. Further, in FIGS. 16 and 17, configurations identical to those illustrated in FIG. 2 are not described in detail.

The second casing 23 can be formed of a resin or a metal, and is formed in the present embodiment of magnesium for improving impact resistance. The second casing 23 is made thin, having a thickness of about a few millimeters, for thinning or lightening the second main body 2. The second casing 23 includes the bottom portion 23a, the first side portion 23b, the second side portion 23c, the third side portion 23d, and the fourth side portion 23e. The bottom portion 23a is disposed opposed to a rear face of the display panel 22 (back face of the display face 22a). The first side portion 23b, the second side portion 23c, the third side portion 23d, and the fourth side portion 23e are provided upright on an outer peripheral edge of the bottom portion 23a in such a manner as to surround the bottom portion 23a. The second side portion 23c is a side portion that is substantially parallel to and closest to a line segment connecting a pair of the hinge portions 3 (see FIG. 1). The first side portion 23b is a side portion that is formed at a position substantially parallel to and opposed to the second side portion 23c. The third side portion 23d and the fourth side portion 23e are opposed to each other, and their both ends are connected respectively to the first side portion 23b and the second side portion 23c.

The second casing 23 includes a resin portion 2b. The resin portion 2b is arranged at a place on which the antenna module 24 is disposed in the second casing 23. The resin portion 2b is not limited to a resin, and may be formed from a material that at least does not block the transmission/reception of radio waves in the antenna module 24. The resin portion 2b may be arranged entirely in the longitudinal direction of the first side portion 23b, or may be formed partially in the longitudinal direction of the first side portion 23b (place on which the antenna module 24 is disposed).

In an assembly of the second main body 2, in FIG. 17, first, the display panel 22 is fixed by bonding to the back face of the frame portion 21a of the first casing 21 using an adhesive, a double-faced tape or the like. At this time, a part or an entirety of an effective display area of the display face 22a is disposed as specified with respect to the opening portion 21b of the first casing 21. In other words, the display panel 22 is disposed in the first casing 21 so that an image displayed on the display face 22a can be seen from the outside via the opening portion 21b.

Next, the antenna module 24 is held in such a manner as to overlap an antenna holding region 23j (described later with reference to FIG. 18) formed on the second casing 23. Specifically, one end of the antenna module 24 in the longitudinal direction is sandwiched together with the antenna holding portion 23f by the clip 40, and the other end thereof in the longitudinal direction is held by the antenna holding portion 23g. Note here that a configuration of the clip 40 and a specific holding structure of the antenna module 24 will be described later.

2. Holding Structure of the Antenna Module 24

Figure 18:
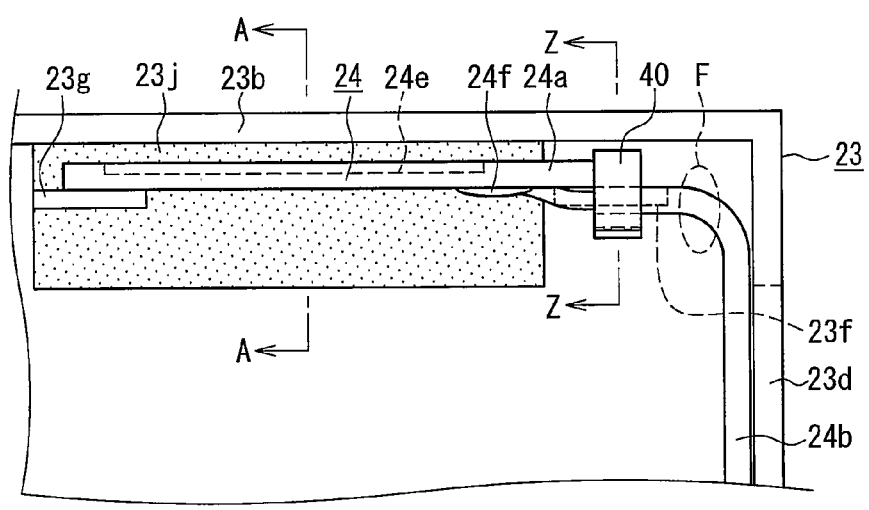
FIG. 18 is a main portion plan view of a section C in FIG. 17.
Figure 19A:
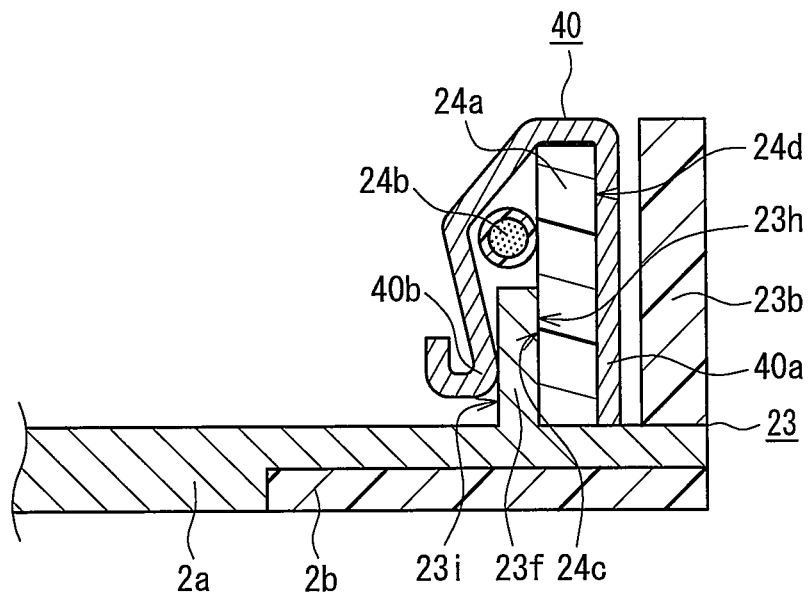
FIG. 19A is a cross-sectional view taken along a line Z-Z in FIG. 18.
Figure 19B:
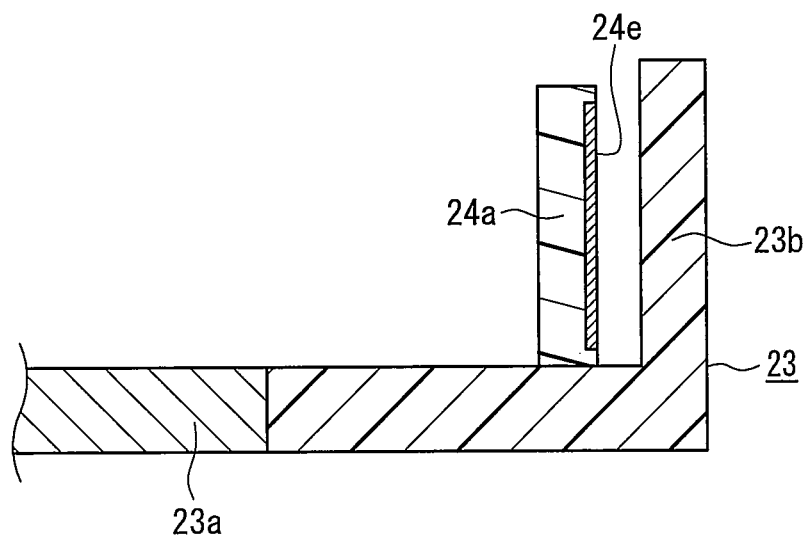
FIG. 19B is a cross-sectional view taken along a line A-A in FIG. 18.

FIG. 18 is an enlarged plan view of a section C in FIG. 17. FIG. 19A is a cross-sectional view taken along a line Z-Z in FIG. 18. FIG. 19B is a cross-sectional view taken along a line A-A in FIG. 18.

As shown in FIG. 18, in the vicinity of an intersection of the side portion 23b and the side portion 23d in the bottom portion 23a of the second casing 23, the antenna holding region 23j is formed. The antenna holding region 23j is formed from a material not blocking radio waves, such as a resin. The antenna holding region 23j is a region that overlaps with at least a transmission/reception portion 24e of the antenna module 24 in the state where the antenna holding portion 23f holds the antenna module 24. The antenna holding portion 23g is formed in the antenna holding region 23j. In the vicinity of the antenna holding region 23j, the antenna holding portion 23f is formed. A space in which at least the board 24a of the antenna module 24 can be disposed is provided between the antenna holding portions 23f, 23g and the side portion 23b of the second casing 23.

As shown in FIG. 19A, the antenna holding portion 23f has a contact surface 23h that can be in contact with a ground pattern 24c provided on the board 24a. An end of a metallic portion 2a is sandwiched by the side portion 23b and the resin portion 2b. In the present embodiment, since the antenna holding portion 23f is made from the same material as the metallic portion 2a of the second casing 23, metal is exposed also on the contact surface 23h.

Note here that, in the present embodiment, the second casing 23 is composed of the metallic portion 2a and the resin portion 2b, but is not limited thereto as long as at least a part of the second casing 23 that comes into contact with the ground pattern 24c of the antenna module 24 is formed of a conductor. Further, a part of the second casing 23 excluding at least the contact surface 23h may be coated by the insulator. By bringing the ground pattern 24c of the antenna module 24 into electrically contact with the metallic part exposed on the contact surface 23h, the ground pattern 24c of the antenna module 24 is allowed to be a ground potential. The antenna holding portion 23f has a contact face 23i that can be in contact with a second sandwiching portion 40b (described later) of the clip 40.

Further, as shown in FIG. 18, one end of the antenna module 24 in the longitudinal direction is positioned between the antenna holding portion 23f and the side portion 23b so as to be sandwiched by the clip 40, and the other end thereof in the longitudinal direction is held between the antenna holding portion 23g and the side portion 23b.

Further, as shown in FIG. 19B, the antenna module 24 includes the transmission/reception portion 24e on one principal face of the board 24a. The transmission/reception portion 24e can transmit electromagnetic waves to the outside and receive electromagnetic waves transmitted from the outside. The antenna module 24 is positioned so that the transmission/reception portion 24e is opposed to the side portion 23b. The side portion 23b preferably is made from a material not blocking radio waves. Therefore, it is possible to reduce an effect (blockage) by the side portion 23b with respect to the transmission/reception of electromagnetic waves in the transmission/reception portion 24e.

As shown in FIG. 18, the coaxial cable 24b is connected to the board 24a by soldering (soldered portion 24f). The coaxial cable 24b is drawn along the side portions 23b and 23d of the second casing 23; connected electrically to the electric circuit board (not shown) housed in the first main body 1 (see FIG. 1); and plays a role in transmitting and receiving electromagnetic waves.

Figure 20:
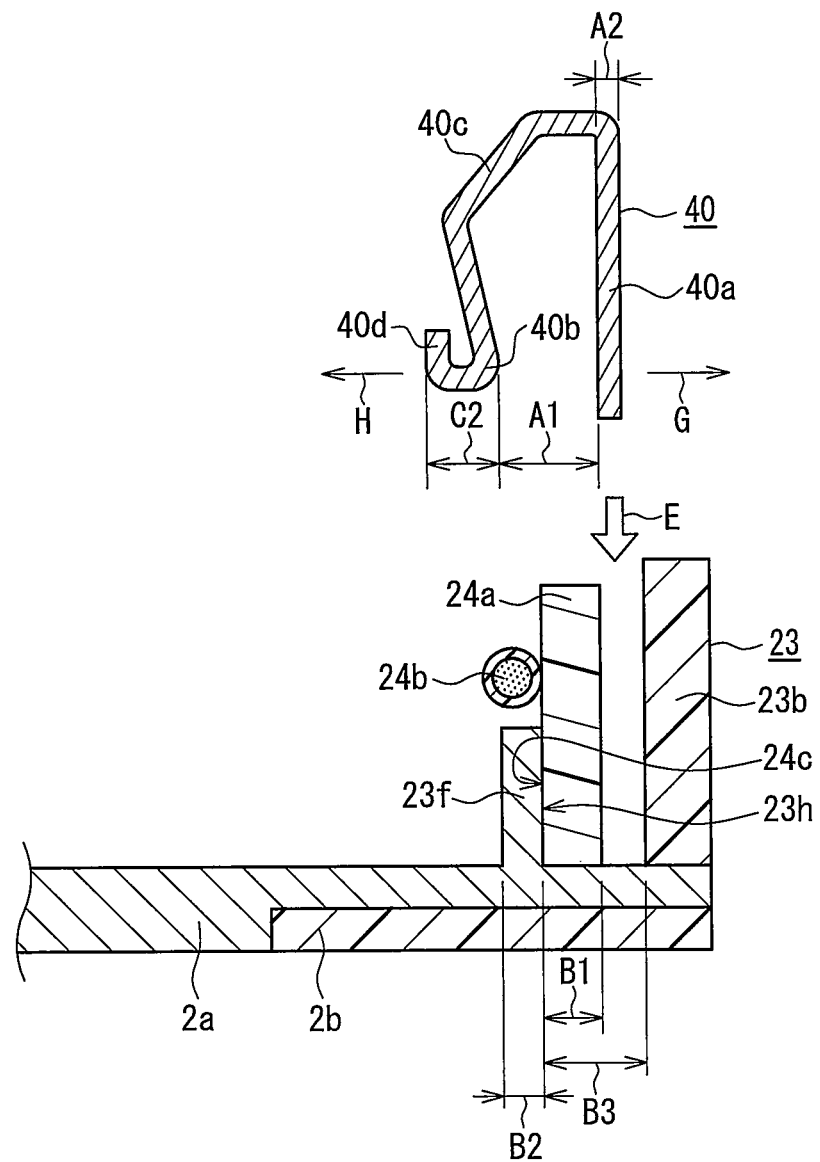
FIG. 20 is an exploded cross-sectional view of the clip and the casing.

FIG. 20 is an exploded cross-sectional view of the clip 40 and the second casing 23. The clip 40 is formed of a metal or a thin resin whose entire body has spring characteristics. Note here that in the case where the clip 40 affects the transmission/reception properties of the antenna module 24, it is possible to form the clip 40 from an insulating material such as a resin. As shown in FIG. 20, the clip 40 includes the sandwiching portions 40a and 40b so as to sandwich the board 24a and the antenna holding portion 23f. Specifically, the first sandwiching portion 40a of the clip 40 holds a front face 24d side of the board 24a (if a face with the ground pattern 24c in the board 24a is defined as "back face"), and the second sandwiching portion 40b holds a contact face 23i side of the antenna holding portion 23f. Further, as shown in FIG. 20, the clip 40 has a relationship expressed by:

$$A1 \leq (B1+B2)$$

where A1 represents a space between the first sandwiching portion 40a and the second sandwiching portion 40b in a free state (no-load state), B1 represents a thickness of the board 24a (including a thickness of the ground pattern 24c), and B2 represents a thickness of the antenna holding portion 23f. Note here that there is a relationship expressed by:

$$B3 > (B1+A2)$$

where B3 represents a space between the antenna holding portion 23f and the side portion 23b of the second casing 23; B1 represents the thickness of the board 24a; and A2 represents a thickness of the first sandwiching portion 40a in the clip 40. Thereby the board 24a and the first sandwiching portion 40a of the clip 40 can be disposed between the antenna holding portion 23f and the side portion 23b.

In the case of sandwiching the antenna holding portion 23f and the board 24a by the clip 40, first, the first sandwiching portion 40a is deformed elastically in the direction shown by the arrow G so that the space A1 at least becomes larger than the sum of the dimension B1 and the diameter of the coaxial cable 24b, and the second sandwiching portion 40b is deformed elastically in the direction shown by the arrow H. Note here that the amounts of elastic deformation of the first sandwiching portion 40a and the second sandwiching portion 40b in the present embodiment are the case where the diameter of the coaxial cable 24b is larger than the dimension B2. When the diameter of the coaxial cable 24b is smaller than the dimension B2, the first sandwiching portion 40a and the second sandwiching portion 40b are deformed elastically so that the space A1 becomes larger than the sum of the dimensions B1 and B2, whereby the board 24a and the antenna holding portion 23f can be sandwiched by the clip 40.

Next, the clip 40 is moved in the direction shown by the arrow E while the first sandwiching portion 40a and the second sandwiching portion 40b are expanded by pressing in the directions shown by the arrows G and H, respectively. Then, the first sandwiching portion 40a is inserted between the side portion 23b and the board 24a, and the second sandwiching portion 40b is moved to the position opposed to the contact face 23i of the antenna holding portion 23f. At this time, the clip 40 is moved in the direction shown by the arrow E until an end of the first sandwiching portion 40a comes into contact with the bottom portion 23a. Thus, the clip 40 is positioned. Note here that although in the present embodiment the clip 40 is positioned where the end of the first sandwiching portion 40a comes into contact with the bottom portion 23a, it may be positioned where both the first sandwiching portion 40a and the second sandwiching portion 40b come into contact with the bottom portion 23a.

Next, the first sandwiching portion 40a and the second sandwiching portion 40b are released from the state of being expanded by pressing, and hence, a force to return to its original shape acts in the clip 40. Thereby, as shown in FIG. 19A, the first sandwiching portion 40a contacts and presses the front face 24d of the board 24a, and the second sandwiching portion 40b contacts and presses the contact face 23i of the antenna holding portion 23f. That is, the clip 40 is in a state of sandwiching the board 24a and the antenna holding portion 23f. The clip 40 sandwiches the board 24a and the antenna holding portion 23f, with the shape being deformed in a relationship expressed by:

$$A1=(B1+B2).$$

3. Effects of Embodiment, etc.

According to the present embodiment, since the board 24a and the antenna holding portion 23f are sandwiched by the clip 40, the antenna module 24 is less likely to be displaced in a direction where the antenna module 24 is detached from the antenna holding portion 23f (direction where the antenna module 24 comes out from a space between the first side portion 23b and the antenna holding portion 23f), whereby the position is stabilized. Therefore, even if shocks or vibrations are applied to the second main body 2, the antenna module 24 is less likely to be displaced, whereby the change in the transmission/reception properties in the antenna module 24 can be suppressed. Further, since there is a low possibility that the ground pattern 24c on the board 24a and the antenna holding portion 23f are spaced apart from each other, the ground state of the antenna module 24 can be stabilized.

Further, since the antenna module 24 is held to the second casing 23 by the clip 40, a means (screws, soldering, or the like) for fixing the clip 40 to the second casing 23 is not required. Thereby the number of components is reduced, and costs can be reduced.

Further, a step of fixing the antenna module 24 by screws, soldering, or the like is not required when the antenna module 24 is held to the second casing 23. Thereby the number of assembling steps is reduced, and the assembly becomes easier.

Furthermore, since the resin portion 2b is provided in the second casing 23, effects with respect to the transmission/reception properties of the antenna module 24 can be suppressed.

Note here that, in the present embodiment, as shown in FIG. 19A, etc., in the state where the clip 40 sandwiches the board 24a and the antenna holding portion 23f, there is a space between the clip 40 and the coaxial cable 24b. However, the present invention may have a configuration in which the clip 40 and the coaxial cable 24b are in contact with each other. By bringing the clip 40 and the coaxial cable 24b into contact with each other, the position of the coaxial cable 24b is stabilized and, for example, distortion at the connection part (soldered part) between the board 24a and the coaxial cable 24b, or disturbance owing to shocks can be suppressed. Therefore, poor connection attributed to, for example, the distortion at the connection part between the board 24a and the coaxial cable 24b can be prevented, or the resistance against shocks or the like can be improved.

Further, in the present embodiment, the case has been described where the coaxial cable 24b is applied as a connection wiring for connecting the transmission/reception portion 24e of the antenna module 24 and the electric circuit board housed in the first main body 1, but a connection wiring that establishes continuity between the transmission/reception portion 24e and the electric circuit board can be applied.

Further, as shown by the arrow E in FIG. 20, the board 24a and the antenna holding portion 23f are sandwiched by displacing the clip 40 in a direction substantially perpendicular to the bottom portion 23a, but they also can be sandwiched by displacing the clip 40 in a planar direction of the bottom portion 23a. Specifically, first, in the vicinity of a section F of the coaxial cable 24b (see FIG. 18) for example, the coaxial cable 24b is inserted in the curved portion 40c of the clip 40.

Next, the clip 40 is moved to the board 24a side along the coaxial cable 24b, and then, the first sandwiching portion 40a is inserted between the board 24a and the side portion 23b, and the other end 40b is moved to the contact face 23i side of the antenna holding portion 23f. At this time, since the space A1 between the sandwiching portions 40a and 40b of the clip 40 in a free state is smaller than the sum of the thickness B1 of the board 24a and the diameter of the coaxial cable 24b, the first sandwiching portion 40a and the second sandwiching portion 40b are deformed elastically so that the space A1 becomes larger than the sum of the dimension B1 and the diameter of the coaxial cable 24b, and are moved to a position to sandwich the board 24a and the antenna holding portion 23f. By inserting the first sandwiching portion 40a between the board 24a and the side portion 23b, moving the other end 40b to the contact face 23i side of the antenna holding portion 23f, and thereafter releasing the clip 40 from the state of being deformed elastically, the first sandwiching portion 40a contacts and presses the board 24a, and the second sandwiching portion 40b contacts and presses the contact face 23i of the antenna holding portion 23f. Thereby the clip 40 sandwiches the board 24a and the antenna holding portion 23f. Note here that the amounts of elastic deformation of the first sandwiching portion 40a and the second sandwiching portion 40b are the case where the diameter of the coaxial cable 24b is larger than the dimension B2. When the diameter of the coaxial cable 24b is smaller than the dimension B2, the first sandwiching portion 40a and the second sandwiching portion 40b are deformed elastically so that the space A1 becomes larger than the sum of the dimensions B1 and B2, whereby the board 24a and the antenna holding portion 23f can be sandwiched by the clip 40.

Figure 21:
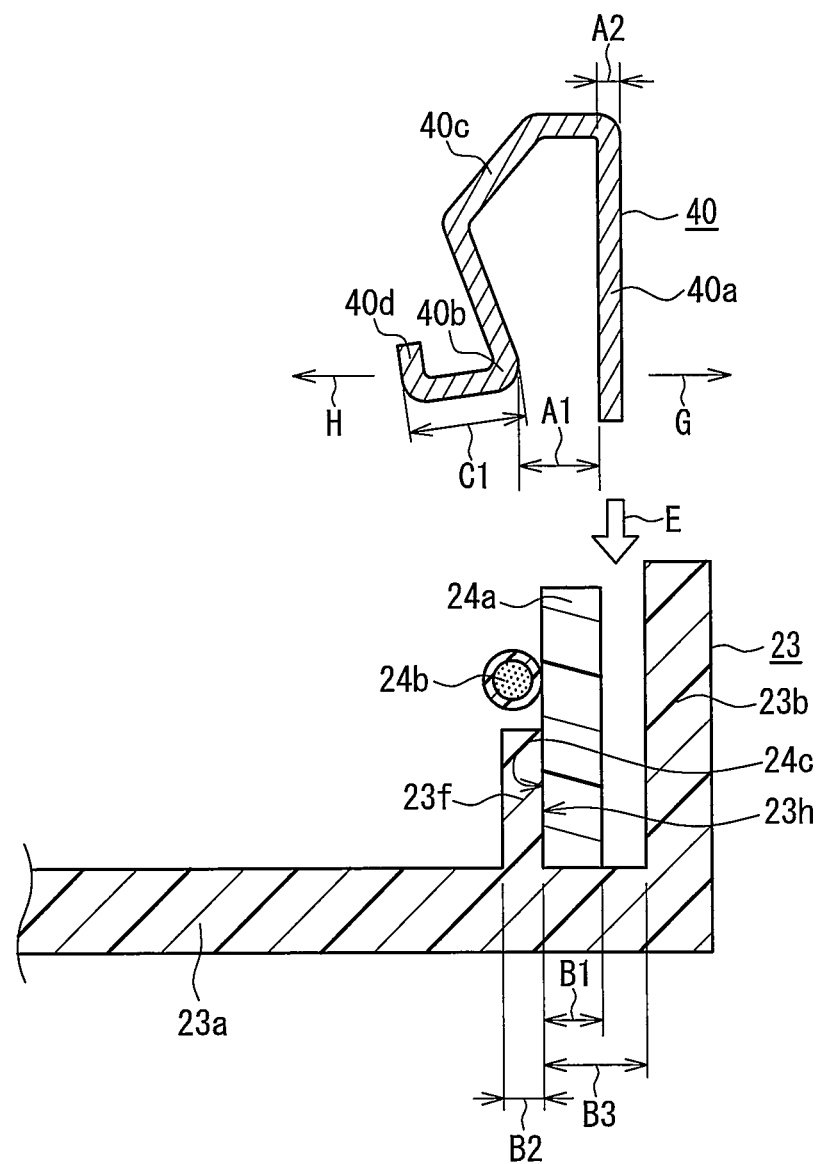
FIG. 21 is an exploded cross-sectional view showing a modification example 1 of the clip and the casing.

FIG. 21 is a main portion cross-sectional view of the clip 40 and the second casing 23 according to the modification example 1 (see FIG. 8). By making the length C1 of the extended portion 40d longer as shown in FIG. 21, a user can grasp the extended portion 40d easily by fingers when sandwiching the board 24a and the antenna holding portion 23f by the clip 40 and/or the clip 40 can be deformed easily because of the increased moment at the time of the deformation. This allows the clip 40 to sandwich the board 24a and the antenna holding portion 23f easily.

Figure 22:
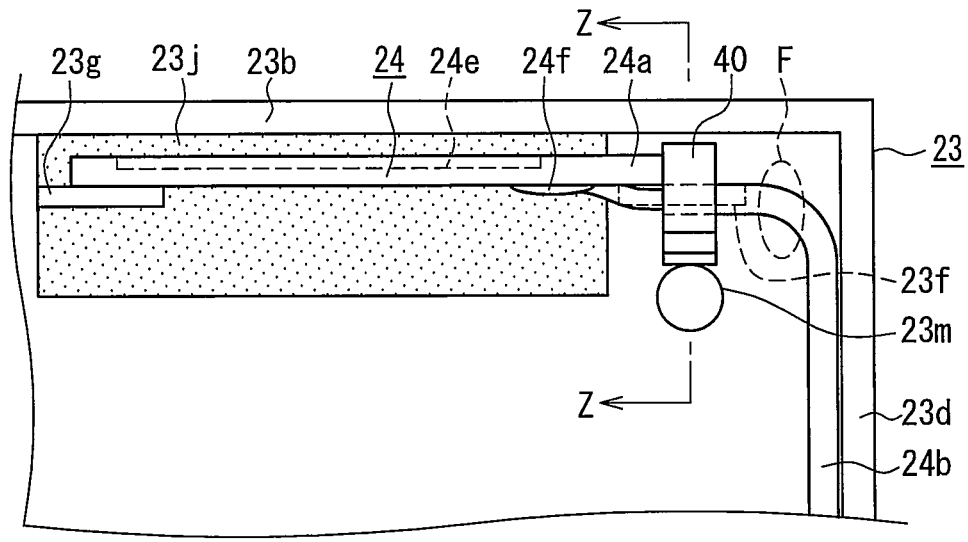
FIG. 22 is a main portion plan view showing a modification example 2 of the clip and the casing.
Figure 23:
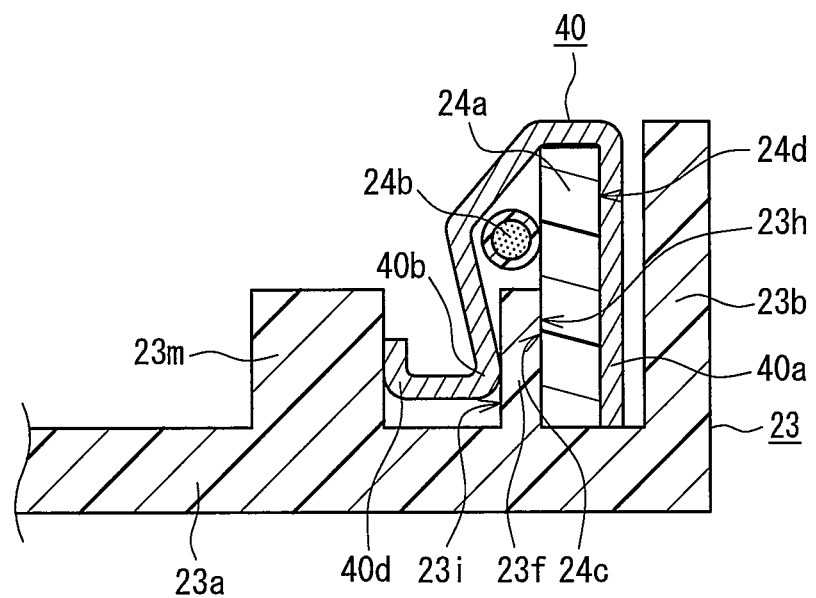
FIG. 23 is a cross-sectional view taken along a line Z-Z in FIG. 22.
Figure 24:
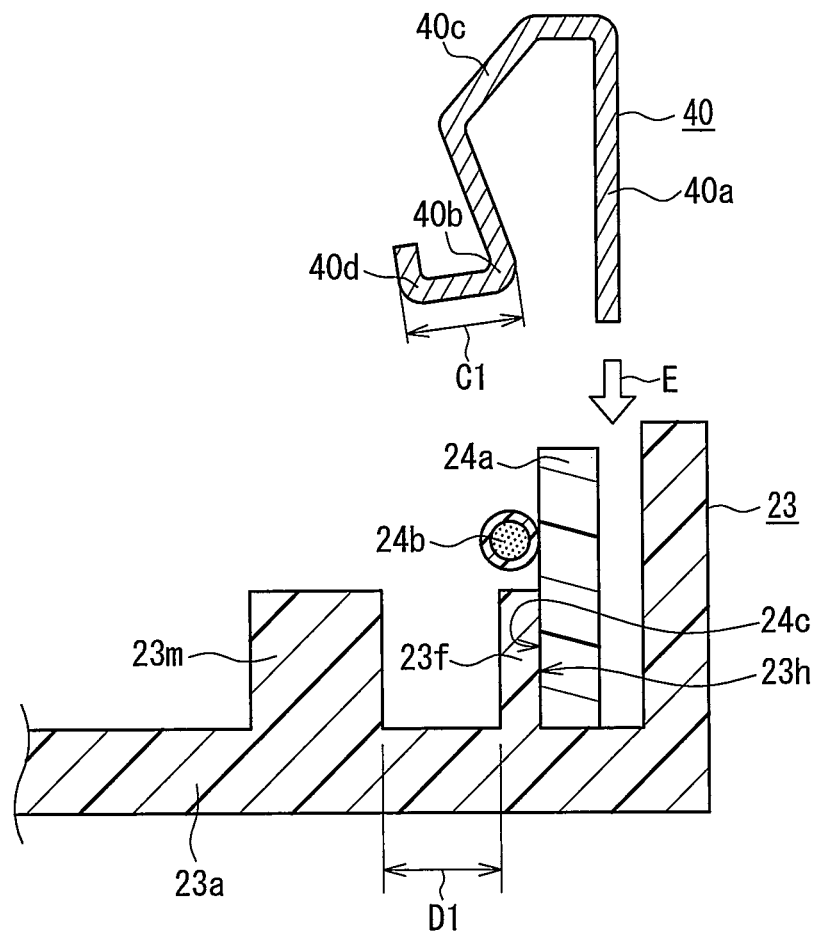
FIG. 24 is an exploded cross-sectional view of the clip and the casing.

Further, as shown in FIGS. 22-24, the vicinity of the second sandwiching portion 40b of the clip 40 may be press-fitted into a part of the second casing 23 so that the clip 40 is held to the second casing 23 (modification example 2). FIG. 22 is a main portion plan view showing the vicinity of the intersection of the side portion 23b and the side portion 23d in the second casing 23. FIG. 23 is a cross-sectional view taken along a line Z-Z in FIG. 22. FIG. 24 is an exploded cross-sectional view of the clip 40 and the second casing 23. The second casing 23 shown in FIGS. 22-24 additionally includes the cylindrical protrusion 23m, as compared with the second casing 23 shown in FIG. 19A. As shown in FIG. 24, there is a relationship expressed by:

$$C1 \geq D1$$

where C1 represents the width dimension of the extended portion 40d of the clip 40, and D1 represents the space between the protrusion 23m and the antenna holding portion 23f. Therefore, when the board 24a and the antenna holding portion 23f are sandwiched by the clip 40, a part between the second sandwiching portion 40b and the extended portion 40d is press-fitted into a part between the antenna holding portion 23f and the protrusion 23m. With this configuration, the clip 40 can be held more strongly at the sandwiching position, and the displacement of the antenna module 24 can be suppressed further. Moreover, the clip 40 is unlikely to drop off from the second casing 23.

Figure 25:
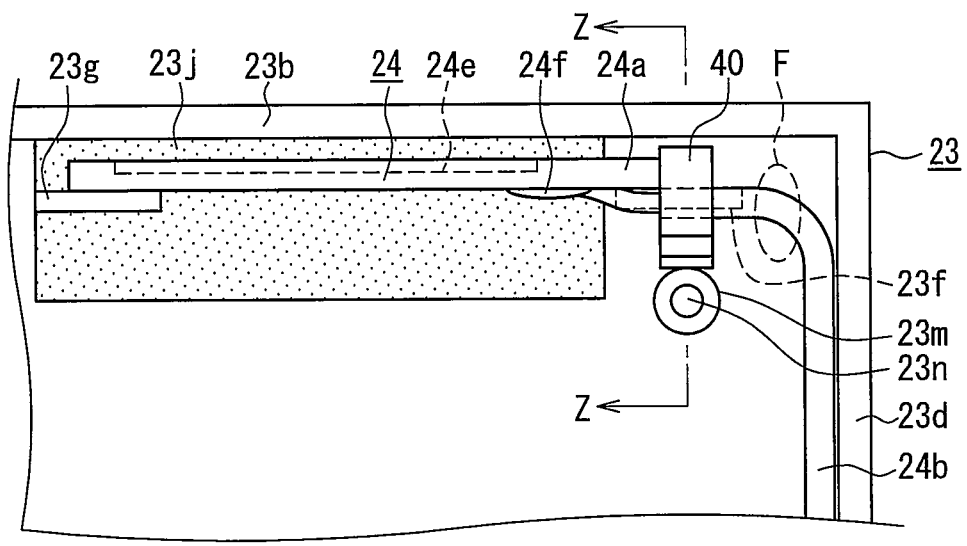
FIG. 25 is a main portion plan view showing a modification example 3 of the clip and the casing according to Embodiment 2.
Figure 26:
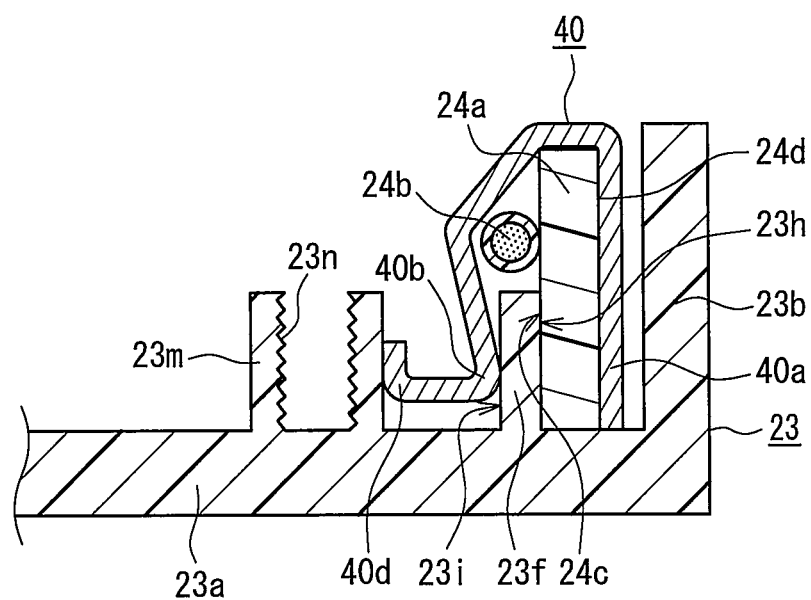
FIG. 26 is a cross-sectional view taken along a line Z-Z in FIG. 25.

FIG. 25 is a plan view of the casing that includes the protrusion 23*m* with the screw hole 23*n*. FIG. 26 is a cross-sectional view taken along a line Z-Z in FIG. 25. The protrusion 23*m* may be configured, not only for holding the clip 40, but also, for example, to have the screw hole 23*n* as shown in FIGS. 25 and 26 (modification example 3). The screw hole 23*n* is a hole in which a screw is inserted when the first casing 21 and the second casing 23 are fixed with each other using the screw. With this configuration, the protrusion 23*m* and the screw hole 23*n* are provided in the same area, whereby the second casing 23 can be downsized.

Further, in the present embodiment, the clip 40 is made of a resin, but it may be formed of a conductor such as a metal. By forming the clip 40 from a conductor, and when the front face 24*d* of the board 24*a* of the antenna module 24 also is provided with a ground pattern for example, it is possible to set the ground pattern as a ground potential. Specifically, by bringing the first sandwiching portion 40*a* of the clip 40 into contact with the ground pattern on the front face 24*d* of the board 24*a*, and bringing the second sandwiching portion 40*b* of the clip 40 into contact with the antenna holding portion 23*f*, the ground pattern on the front face 24*d* and the metallic antenna holding portion 23*f* are connected electrically with each other, which allows the ground pattern to be a ground potential.

Further, an area in the front face 24*d* of the board 24*a* that comes into contact with the first sandwiching portion 40*a* of the clip 40 and an area in the antenna holding portion 23*f* that comes into contact with the second sandwiching portion 40*b* of the clip 40 may be shaped to have a high friction coefficient (shape with slight projections and depressions, etc.). With this configuration, the clip 40 is even less likely to be displaced in the direction shown by the arrow D, whereby the location of the antenna module 24 is stabilized. In the configuration shown by FIGS. 22-24, it is preferable that a cylindrical surface of the protrusion 23*m* also is shaped to have a high friction coefficient. Note here that the parts having high friction coefficients in the antenna holding portion 23*f* and the protrusion 23*m* can be formed at the same time as the molding of the second casing 23, whereby the number of components is not increased, and the number of steps in assembling the laptop computer is not increased. Further, the part having a high friction coefficient in the front face 24*d* of the board 24*a* can be formed at the same time as the manufacture of the board 24*a* by the molding of a resin, whereby the number of components is not increased, and the number of steps in assembling the laptop computer is not increased.

Note here that both the protrusion 23*m* have been explained as protrusions having a cylindrical shape, but the protrusion 23*m* may include a flat face parallel to the extended portion 40*d*, on the face that comes into contact with the extended portion 40*d* when the clip 40 is mounted. With this configuration, a contact area between the flat face of the protrusion 23*m* and the extended portion 40*d* is increased, whereby dropping of the clip 40 can be suppressed more reliably.

Further, in the present embodiment, the coaxial cable 24*b* is applied for reducing noise while keeping an impedance of 50Ω at the wiring portion, but the shape of the wiring is not limited as long as it establishes impedance matching.

Further, in the present embodiment, the laptop computer is illustrated as an example of electronic equipment, but the electronic equipment is not limited thereto as long as it includes at least an electric circuit board and a casing for holding the electric circuit board.

Furthermore, the ground pattern 24*c* in the present embodiment is an exemplary ground portion. The board 24*a* in the present embodiment is an exemplary board. The antenna holding portion 23*f* in the present embodiment is an exemplary holding portion. The second casing 23 in the present embodiment is an exemplary casing. The clip 40 in the present embodiment is an exemplary grasping member. The first sandwiching portion 40*a* in the present embodiment is an exemplary first sandwiching portion. The second sandwiching portion 40*b* in the present embodiment is an exemplary second sandwiching portion. The protrusion 23*m* in the present embodiment is an exemplary protrusion. The antenna holding region 23*j* in the present embodiment is an exemplary region overlapping the antenna circuit.

What is claimed is:

1. Electronic equipment, comprising:
   a board that includes an antenna circuit capable of transmitting and receiving a wireless signal directly to/from outside of the equipment and a ground portion for electrically grounding the antenna circuit; and
   a casing that has a holding portion for holding the board, the holding portion being formed as one piece with the casing,
   wherein at least the holding portion in the casing is formed of a conductor,
   the electronic equipment further comprising:
   a grasping member that sandwiches the holding portion and the board in a state where the ground portion and the holding portion are in direct contact with each other.

2. The electronic equipment according to claim 1, wherein the grasping member is elastically deformable.

3. The electronic equipment according to claim 2,
   wherein the grasping member includes a first sandwiching portion capable of being in contact with the board and a second sandwiching portion capable of being in contact with the holding portion, and
   a space of the grasping member between the first sandwiching portion and the second sandwiching portion in a free state is smaller than the sum of a thickness of the holding portion and a thickness of the board.

4. The electronic equipment according to claim 3,
   wherein the casing includes a protrusion in the vicinity of the holding portion, and
   the protrusion and the holding portion sandwich the second sandwiching portion side of the grasping member.

5. The electronic equipment according to claim 1,
   wherein a region of the casing that overlaps with the antenna circuit in a state where the holding portion holds the board is formed from a material not blocking a radio wave.

6. The electronic equipment according to claim 1,
   wherein the grasping member sandwiches the holding portion and the board with the ground portion and the holding portion in direct contact with each other.

7. The electronic equipment according to claim 1,
   wherein the casing has a nonconductive side portion parallel to the holding portion at an end of the casing, the holding portion and the nonconductive side portion are connected each other, and the board is arranged between the holding portion and the nonconductive side portion.

8. The electronic equipment according to claim 1,
   wherein the casing contains at least one of (a) an electric circuit board on which a signal processing circuit provided in the electronic equipment is mounted and (b) a display device that displays an image by a display signal.

9. The electronic equipment according to claim 1, wherein the holding member comprises a rib extending inwardly from a wall of the casing.

* * * * *